Jan. 28, 1969   H. STACKEGARD   3,424,971
MEANS FOR CONTROLLING REACTIVE POWER IN AN INVERTER STATION
Filed April 26, 1967
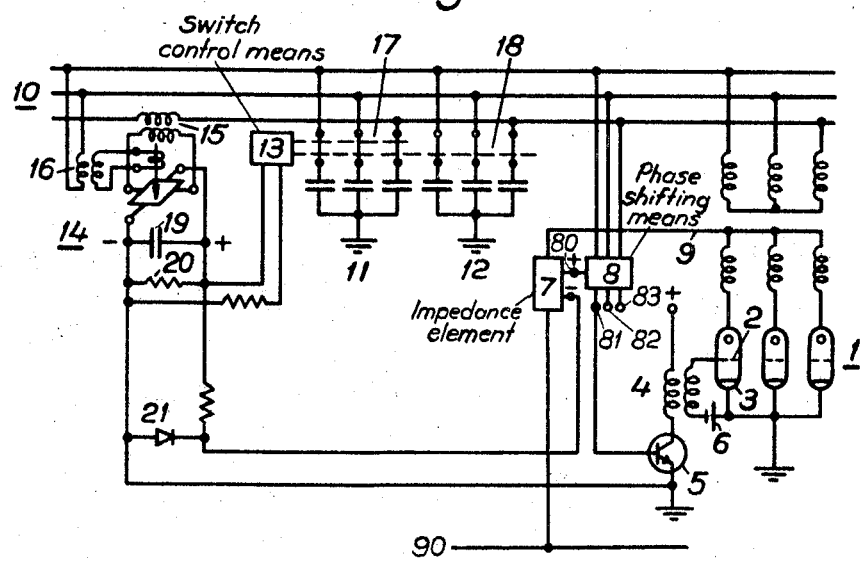
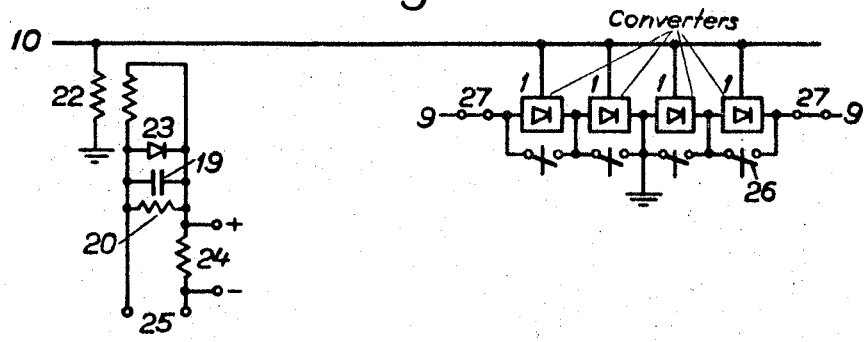
INVENTOR.
HANS STACKEGÅRD
BY
Bailey, Stephens + Huettig United States Patent Office 3,424,971
Patented Jan. 28, 1969

3,424,971
MEANS FOR CONTROLLING REACTIVE POWER IN AN INVERTER STATION
Hans Stackegard, Ludvika, Sweden, assignor to Allmänna Svenska Elektriska Aktiebolaget, Vasteras, Sweden, a corporation of Switzerland
Filed Apr. 26, 1967, Ser. No. 633,800
U.S. Cl. 321—18
Int. Cl. H02m 1/08, 7/44
5 Claims

ABSTRACT OF THE DISCLOSURE

An inverter station connecting a DC line to an AC network and comprising a commutation margin control device and a capacitor bank for generating reactive power. A reference magnitude means giving an output magnitude representative for the reactive power of the AC network controls on the one hand said commutation margin control device, on the other hand the capacitance of said capacitor bank with respect to minimum reactive power.

BACKGROUND OF THE INVENTION

Field of the invention

The present invention relates to a means for controlling the reactive power in an inverter station, the inverter station comprising a capacitor bank with a control device, for example a tap-selector or a section arrangement for adjusting the capacitance of the capacitor bank and a device, a so-called commutation margin control device, to ensure a certain minimum commutation margin in the rectifiers of the inverter.

The prior art

Within the converter field it is known that an inverter represents a relatively large inductance in relation to its rated output and for this reason some form of phase compensation should be arranged, for example in the form of a synchronous compensator or a capacitor bank. The former provides good control, but it is expensive. A capacitor bank is considerably cheaper and a control of this can be effected with the help of some sort of tap-selector, whereby parts of the bank can be connected and disconnected so that a suitable capacitance is obtained. Such control is, however, rather slow in comparison with a synchronous compensator and also with respect to the demands for rapid control normally existing for a converter.

The equivalent inductance of the inverter, and thus its need of reactive compensating power, is dependent on its delay angle in such a way that the inductance, and thus the demand for reactive power, is least when the inverter is set for full inversion which means that the delay angle for the inverters is as near to 180° as can be permitted with continued undisturbed commutation. Maximum inductance, and thus maximum demand for reactive power, exists at a delay angle of about 90°. It is also known that when controlling an inverter a certain minimum commutation margin for the rectifiers of the inverter must be maintained so that the maximum permitted delay angle will be 180° minus the sum of the commutation time and the required commutation margin. To maintain a certain commutation margin, therefore, the commutation voltage and load current of the inverter must be taken into account since the commutation time is roughly proportional to the direct current of the inverter and inversely proportional to the commutation voltage. In order at varying load current and commutation voltage to ensure a desired least commutation margin, an inverter is provided with a commutation margin control device, which, depending on the commutation voltage and the load current and a predetermined commutation margin, calculates the correct delay angle for each commutation.

SUMMARY OF THE INVENTION

The present invention is based on the fact that by operating on the commutation margin control device of the inverter it is possible to increase the commutation margin of the inverter and thus its reactive power consumption and an inverter according to the invention is characterised in that it comprises a means to derive a reference magnitude from the AC network connected to the inverter, which reference magnitude represents the reactive power of the inverter station. Said reference magnitude, which is taken out in the form of a DC magnitude, is supplied to said commutation margin control device and also to said control means for the capacitor bank in such a way that a reduction in the reactive power consumption of the inverter station causes first an increase in the commutation margin of the rectifiers and then a decrease in the capacitance of the capacitor bank.

Control of this type is important, for example, when a part of the load on the AC network connected to the inverter is disconnected. Due to the influence from the capacitor bank such a load reduction causes a voltage increase in the AC network. Another case where control of the reactive power is desirable is at partial disconnection of the DC transmission link, for example if in a 2-polar transmission with earthed centre tapping one of the poles is disconnected. In such a case the capacitance of the capacitor bank will be too great in relation to the reactive power consumption of the inverter station and an adjustment is necessary.

The mentioned disturbances cause an alteration in the reference magnitude derived from the AC network, and according to the invention first of all the commutation margin of the inverter is increased so that balance is re-established between the capacitance of the capacitor bank and the inverter's need of reactive power. After a suitable part of the capacitor bank has been disconnected, the balance between the bank and the inverter's need of reactive power will alter in the opposite direction whereby the reference magnitude connected to the commutation margin control device will decrease and the commutation margin for the inverter is decreased to the original value. In this way, according to the invention it is possible to use a capacitor bank to generate reactive power and still obtain efficient and rapid voltage control in the same way as with a synchronous compensator.

It is clear from the above that the reactive power in the AC network connected to the inverter can be used as reference magnitude, for example measured with the help of a Hall generator. Since the intention is to limit the reactive power fluctuation to the least possible, the control according to the invention must be effected as soon as the reactive power alteration exceeds a certain low value. It is also possible to use the voltage in the AC network as reference magnitude, since the need to keep the reactive power consumption constant emanates from the necessity of keeping the voltage variations within certain limits. In this case the actual network voltage or the alteration in network voltage is compared with a certain reference value.

BRIEF DESCRIPTION OF THE DRAWINGS

The invention will be further described with reference to the accompanying drawing where FIGURE 1 shows an inverter station provided with a control system according to the invention, while FIGURE 2 shows a variation of the arrangement according to FIGURE 1.

DESCRIPTION OF THE PREFERRED EMBODIMENTS

FIGURE 1 shows a single-way inverter 1 with the pulse number three, comprising a converter-transformer and three rectifiers connected thereto. The input side of the inverter is connected to a DC transmission line 90 through a DC conductor 9. The output side of the inverter is connected to an AC network 10. For one of the rectifiers a control device is shown connected between the control grid 2 and the cathode 3, comprising a grid voltage transformer 4 in series with a grid bias source 6. The primary side of the grid voltage transformer is connected to a positive voltage source in series with a transistor 5, controlled by a commutation margin control device comprising the components 7 and 8. The component 8 is connected to the AC network 10 connected to the inverter station and consists essentially of a phase displacing device to derive a reference alternating voltage to control the various rectifiers and is provided with an output 81, 82, 83 for each of said rectifiers. The component 7 consists of an impedance element through which flows the direct current in the DC conductor 9 feeding the inverter. A direct output voltage is obtained over the impedance element 7 and is connected to a neutral tap 80 in series with each of the separate reference alternating voltages from the element 8. The voltage across the element 7 and the corresponding phase voltage from element 8 are connected to the base electrode of the corresponding transistor 5, and, when the sum of these two voltages is positive, the transistor 5 is conducting and a current arises in the primary side of the grid voltage transformer 4. This current generates a control current for the corresponding rectifier in the secondary circuit of the grid voltage transformer. By suitable dimensioning of the components 7 and 8 it is possible to achieve such a delay angle for the various rectifiers that a certain desired commutation margin is maintained for these, independent of variations in the direct current in the conductor 9 and in the commutation voltages for the rectifiers from the AC network 10. Such a commutation margin control system is shown in British Patent No. 985,674.

A capacitor bank is connected to the AC network 10, consisting of two parallel parts 11 and 12 connected to this network by means of corresponding breakers 17 and 18 controlled with the help of a control system 13, suitably some form of relay system. In fact the capacitor bank consists of a large number of series- and parallel-connected parts which, with the help of corresponding breakers, can be connected and disconnected so that the resulting capacitance of the capacitor bank can be varied in a greater number of steps.

The resultant reactive power in the network 10 is measured with the help of a power measuring device 14 to which is connected a current transformer 15 inserted in one of the phase conductors in the network 10, and a voltage transformer 16 connected between the two other phase conductors in the AC network. The reactive power measurer may be made as a Hall-generator the magnetic field of which is connected to the voltage transformer 16, while the Hall-element itself is connected to the current transformer 15. In this way the output signal from the Hall-generator will be composed of an alternating voltage having a frequency which is double the network frequency and a direct voltage having a polarity dependent on whether the reactive power in the network 10 is inductive or capacitive and a magnitude corresponding to the phase angle between current and voltage in the network 10. By short-circuiting said alternating voltage component from the Hall-generator with the help of the capacitor 19, a direct voltage is obtained across the resistor 20 and connected to the control device 13 for the capacitor bank and to the control circuit for the transistor 5.

When the load is reduced in the AC network 10 or other alternations or disturbances occur in operation so that the reactive power from the capacitor bank exceeds the requirement in the inverter 1 a direct voltage with the shown polarity is obtained across the capacitor 19 and the resistor 20. This direct voltage is added to the direct voltage across the element 7 which means that the delay angle for the rectifiers in the inverter is decreased in the same way as if the direct current in the feeding conductor 9 had been increased. The result is that the commutation between the rectifiers will be completed earlier, that is the commutation margin increases. At the same time the control means 13 for the capacitor bank receives a voltage which causes one capacitor group in the bank to be disconnected so that its capacitance decreases. The signal then disappears from the Hall-generator 14 and the delay angle for the rectifiers in the inverter returns to the value determined by the components 7 and 8.

When the original operation conditions have been reestablished, the capacitor bank will be too small and the reactive power in the network 10 will therefore be inductive. Consequently a new output signal is obtained from the Hall-generator 14 having an opposite polarity to the previous one. This should automatically cause the commutation margin for the rectifiers in the inverter to decrease, but this cannot be permitted with a view to safety in the inverter and the diode 21 is therefore inserted to short-circuit this opposite signal to the transistor 5. However, the signal must be transmitted to the control device 13 to increase the capacitance oft he capacitor bank in stages.

FIGURE 2 is a variation of FIGURE 1 and shows an inverter station comprising four converters 1 connected in series in the DC conductor 9 and provided with an earthed central tapping. The inverters are connected in parallel to each other to the AC network 10 which is shown here in a single-phase arrangement. Instead of the reactive power in the network 10, the voltage in this network is used which, as mentioned earlier, can be used as a reference to control the reactive power of the converter station. For this purpose a voltage transformer 22 is connected to the network 10, the secondary side being connected to the capacitor 19 and the resistor 20 in FIGURE 1. One half-period of the output voltage from the voltage transformer 22 is short-circuited by a diode 23 so that a direct voltage is obtained across the capacitor 19 and resistor 20. The voltage from the voltage transformer 22 must be connected to a reference voltage which may suitably be connected across the resistor 24 with the shown polarity. An output voltage can thus be obtained from the terminals 25 for connection to the control means 13 and the control circuit for the transistor 5 in FIGURE 1.

The inverters 1 are each provided with a bypass member 26 in the form of an isolator so that at a fault in an inverter this can be bypassed and disconnected. Unbalance then arises between the reactive power from the capacitor bank, not shown in FIGURE 2, and the inverters' need of reactive power, thus causing the voltage in the network 10 to increase. Consequently the voltage across the resistor 20 will exceed the voltage across the resistor 24 so that an output voltage is obtained across the terminals 25 to increase the commutation margin of the rectifiers and disconnect parts of the capacitor bank.

Upon a fault in one of the DC conductors 9 this conductor will be disconnected with the help of a switch 27 and the corresponding half of the inverter station will then become currentless. This also causes unbalance between the capacitor bank and the inverter station and a voltage increase thus occurs in the network 10. As in the arrangement according to FIGURE 1 a return to the original conditions will cause unbalance in the reactive power in the opposite direction so that the voltage in the network decreases. A voltage is thus obtained across the terminals 25 having opposite polarity and causing reconnection of parts of the capacitor bank while the commutation margin, on the other hand, due to the diode 21 remains unchanged.

An even more rapid control of the commutation margin and thus the alternating voltage can be obtained if a time derivative means is inserted between the voltage transformer 22 in FIGURE 2 or the means 14 in FIGURE 1 and the control circuit of the transistor. In this way even the derivative of the alteration in the reactive power will increase the commutation margin so that the maximum voltage alteration can be limited in advance.

I claim:

1. Means for controlling the reactive power in an inverter station, which inverter station comprises a capacitor bank with a control device for adjusting the capacitance of the capacitor bank and commutation margin control device to ensure a certain minimum commutation margin in the rectifiers of the inverter, a characterised in that the controlling means comprises means to derive a reference magnitude representing the reactive power of the inverter station, and means to supply said reference magnitude in the form of a DC magnitude to said commutation margin control device and to said control means for the capacitor bank, said control device and said control means including means responsive to a reduction in the reactive power consumption of the inverter station first to cause an increase in the commutation margin of the rectifiers and then to cause a decrease in the capacitance of the capacitor bank.

2. Means according to claim 1, characterised in that the means for deriving said reference magnitude comprises a measuring device for measuring the reactive power in the AC network connected to the inverter station.

3. Means according to claim 1, characterised in that the means for deriving said reference magnitude comprises a voltage transformer for measuring the voltage in the AC network connected to the inverter station and a rectifier connection for rectifying said voltage.

4. Means according to claim 1, characterised in that the connection between said means for deriving said reference magnitude and the commutation margin control device contains an element which blocks the signal from said means for deriving said reference magnitude in response to too great a reactive power consumption of the converter station in relation to the capacitance of the capacitor bank.

5. Means according to claim 1, characterised in that between said means for deriving said reference magnitude and said control devices is inserted a time derivative means for said reference magnitude.

References Cited

UNITED STATES PATENTS 3,249,844   5/1966   Jensen _____ 321—44

JOHN F. COUCH, *Primary Examiner.*

WM. SHOOP, *Assistant Examiner.*

U.S. Cl. X.R.

321—19